United States Patent [19]

Martin

[11] 4,263,494
[45] Apr. 21, 1981

[54] CONTROL MEANS FOR THE RELATIVE DISPLACEMENT OF THE ELECTRODES OF AN EDM APPARATUS

[75] Inventor: Roland Martin, Dingy en Vuache, France

[73] Assignee: Ateliers des Charmilles, S.A., Geneva, Switzerland

[21] Appl. No.: 973,568

[22] Filed: Dec. 27, 1978

[30] Foreign Application Priority Data

Dec. 29, 1977 [CH] Switzerland ............... 16175/77

[51] Int. Cl.³ .............................. B23P 1/12
[52] U.S. Cl. ........................ 219/69 G; 219/69 C
[58] Field of Search ............. 219/69 G, 69 C, 69 M

[56] References Cited

U.S. PATENT DOCUMENTS

| 4,049,942 | 9/1977 | Balleys et al. | 219/69 G |
| 4,057,703 | 11/1977 | Pfau | 219/69 G |
| 4,135,070 | 1/1979 | Pfau et al. | 219/69 G |

Primary Examiner—C. C. Shaw
Attorney, Agent, or Firm—Hauke and Patalidis

[57] ABSTRACT

In an EDM apparatus in which the relative displacement between an electrode tool and an electrode workpiece is effected by a servo motor, a control system for the servo motor to effectuate the relative displacement of the electrodes at a speed depending from the machining conditions at the gap between the electrodes and from the difference between a reference position signal and a signal representing the actual relative position of the electrodes, such as to limit the relative displacement of the electrodes until a predetermined final relative position has been reached.

6 Claims, 2 Drawing Figures

CONTROL MEANS FOR THE RELATIVE DISPLACEMENT OF THE ELECTRODES OF AN EDM APPARATUS

BACKGROUND OF THE INVENTION

The present invention relates to an apparatus for machining by electrical discharges an electrode workpiece by means of an electrode tool, in which the relative displacement of the electrodes is effected at least in one direction by means of a servo motor.

The invention is an important improvement on the system disclosed in U.S. Pat. No. 4,049,942, the invention preventing the electrodes from getting any closer to each other than a predetermined distance or gap while maintaining electrical discharges across the gap until the gap becomes too wide to sustain the electrical discharges, and which permits the electrodes to relatively move away from each other as a function of the machining conditions at the gap. As the maximum distance or gap between the electrodes which permits the occurrence of electrical discharges is exactly known, the precise dimension of the machined surface of the workpiece can be determined according to the relative position of the electrodes at the moment the electrical discharges are no longer capable of being sustained due to too wide a gap.

The apparatus of the present invention provides, in addition to controlling the final machined dimension, a control of the relative displacement velocity of the electrodes during a machining operation. The apparatus of the invention comprises means for controlling the speed of the EDM machine servo-motor by means of a first signal which is a function of the machining conditions and by means of a second signal which is a function of the difference, or error, between the relative position of the electrodes and a reference relative position, the second signal being opposed to the first signal at the moment that the reference relative position is reached, such as to limit the relative displacement of the electrodes until a predetermined final relative position is reached. The apparatus of the invention is further characterized in that it comprises means for continuously varying the reference relative position, in the same direction as the direction in which machining is effected, at a predetermined speed, such as to maintain the difference between the reference and actual positions within predetermined limits.

Such an arrangement, as provided by the invention, presents the advantage of accomplishing, by means of a very simple circuit, two additional functions which, until now, were each achieved by a specific and complicated device. Those two functions are, first, storing in a memory the relative position of the electrodes when the electrodes are withdrawn from each other coupled with a slowing down of the relative closure speed of the electrodes when that relative stored position is reached again after resuming normal relative advance of the electrodes and, secondly, automatically limiting the speed of relative feed in order not to exceed a critical intensity of machining current in the course of a machining operation. As soon as the reference position ceases to vary, the control of the invention stops the machining feed according to the method and system disclosed in the above-mentioned U.S. patent. The invention presents particular advantages when it is used to control a plurality of servo-motors which in turn operate simultaneously the relative displacement of the electrodes along several axes. Such is the case, for example, when the relative displacement is effected in a predetermined direction or axis by means of a first servo-motor and in directions or axes perpendicular to that first direction by means of a second servo-motor. The arrangement of the invention permits to synchronize the displacements of the electrodes in each of the axes while permitting to use at its maximum the dynamic characteristics of the servo-motors for withdrawing the electrodes from each other in the event a machining fault is detected.

In addition, by providing a visual display of the instantaneous reference position, a very stable information of the evolution of the machining operation is provided.

BRIEF DESCRIPTION OF THE DRAWING

The many advantages of the present invention will become apparent to those skilled in the art when the following description of the best mode contemplated for practicing the invention is read in conjunction with the attached drawing which represents, schematically and for illustrative purpose, alternative forms of the invention. In the drawing.

DETAILED DESCRIPTION OF THE PREFERRED EMBODIMENTS

Figure 1:
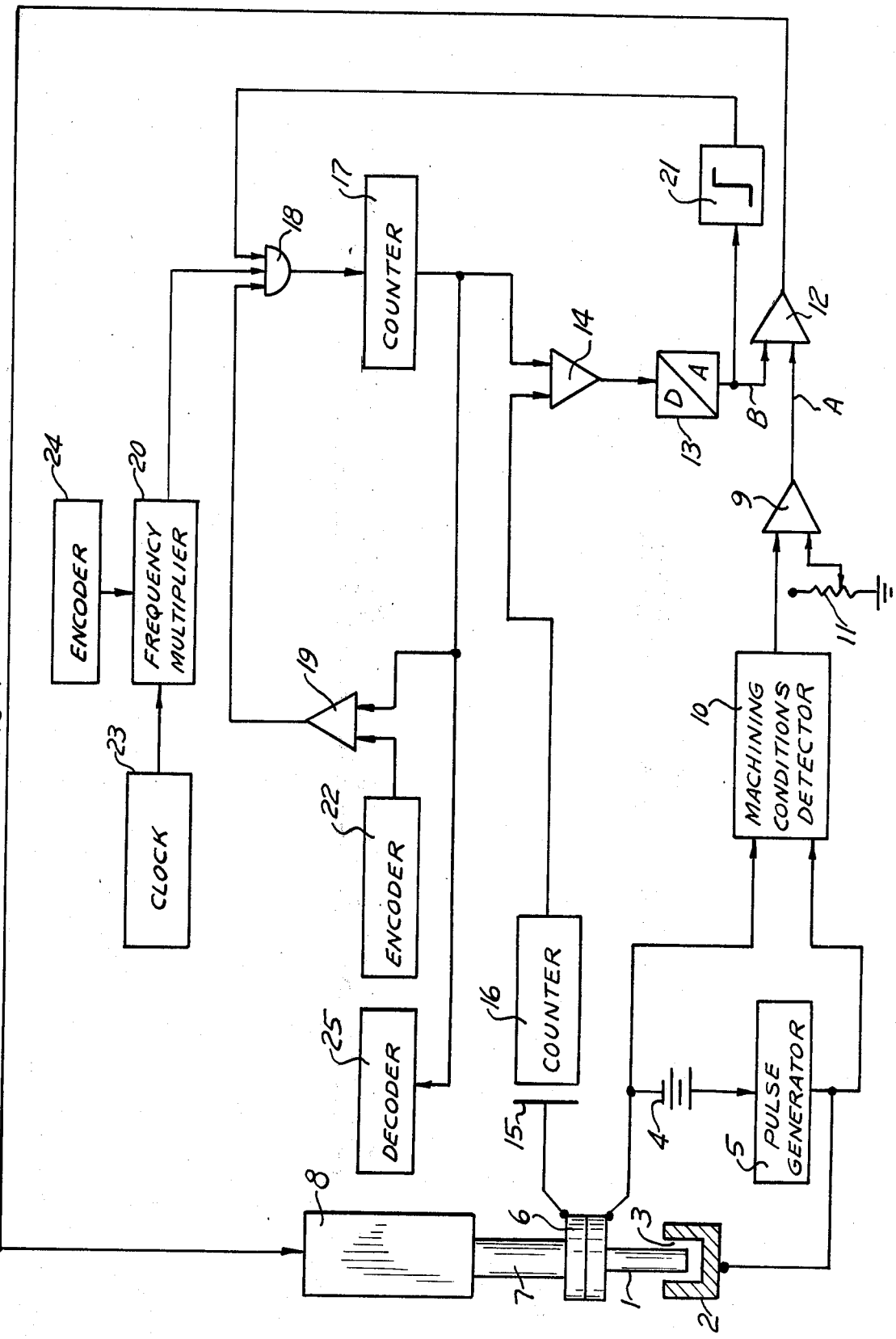
FIG. 1 is a simplified schematic diagram of an example of logic circuit according to the present invention.

As schematically illustrated at FIG. 1, an electrode tool 1 and an electrode workpiece 2 are separated by a gap 3 through which take place consecutive machining electrical discharges obtained from a DC current source 4 and a pulse generator 5, according to principles well known in EDM technology. The electrode tool 1 is supported by a holder 6 mounted on the end of a piston 7 whose motion is controlled by a servo-motor 8. The speed at which the servo-motor 8 advances the electrode tool 1 depends on the level of a command signal obtained at the output of an op-amp differential amplifier or comparator 12 having an input connected to the output of another op-amp differential amplifier or comparator 9, which in turn has one of its input receiving an analog signal which is representative of the machining conditions as supplied by a detector circuit 10, such an analog signal being the average machining voltage measured across the gap 3 between the electrode tool 1 and the electrode workpiece 2. The other input of the op-amp comparator 9 receives a reference voltage supplied by a potentiometer 11. At first signal A supplied at the output of the op-amp comparator 9 is applied to one of the inputs of the op-amp comparator 12, and a second signal B obtained from the output of a digital-analog converter 13 is applied to the other input of the op-amp comparator 12. The signal at the output of the op-amp comparator 12 is the command signal for the servo-motor 8.

The digital-analog converter 13 receives at its input information in digital form which is obtained from the output of a digital numerical comparator 14 having an input connected to a position detector comprising a movable member 15 supported by the tool holder 6 and a counter 16. The other input of the comparator 14 is connected to the output of a pulse counter 17 which receives at its input pulses passing through an AND gate 18. The AND gate 18 has three inputs connected respectively to another digital numerical comparator 19, to the output of a frequency multiplier 20 and to the output of a Schmitt trigger 21. The comparator 19 has an input connected to the output of the counter 17 and another input connected to the output of an encoding circuit 22 which is set to the desired final dimension to be obtained at the end of a machining operation. The frequency multiplier 20 has an input receiving pulses at a predetermined constant frequency obtained from an oscillator or clock 23 and a second input connected to another encoder 24 which is set to the ratio of the frequency of the pulses at the input to the frequency of the pulses at the output of the frequency multiplier 20. The number obtained at the output of the counter 17 is displayed by means of a decoding circuit 25.

The apparatus of the invention functions as follows:

Prior to a machining operation, at least one of the counters 16 and 17 is set such that both counters show the same number, for example the two counters are set to zero, such that there is no output signal at the output of the comparator 14. In addition, the maximum advance speed is preset by means of the encoder 24 and the final dimension of the workpiece is set by means of the encoder 22. At the beginning of the machining operation, the signal B being equal to zero the Schmitt trigger 21 inhibits the AND gate 18 and the counter 17 remains set at zero while the counter 16 counts a number proportional to the advance of the electrode tool 1. The comparaor 14 detects the difference between the numbers in the counters 16 and 17 and the signal B operates the Schmitt trigger 21 to enable the AND gate 18 which passes the pulses supplied at the output of the frequency multiplier 20. The reference magnitude supplied by the counter 17 increases at a predetermined speed. If the machining feed is effected at the same speed, there is no change of the state in this circuit. However, if machining is effected at a feed greater than the reference determined by the counter 17, the signal B increases in value and is opposed to the action of the signal A, such that the actual electrode feed speed is held equal to the reference feed. On the contrary, if the electode feed speed is lower than the reference speed, the signal at the output of the comparator 14 disappears, which causes the signal B to disappear, and the Schmitt trigger 21 inhibits the AND gate 18 such as to stop the variation of the reference speed and to permit the counter 16 to count up towards the reference value until the difference between the two counters 16 and 17 changes its algebraic sign which in turn causes the signal to re-appear at the output of the comparator 14. In such manner, the variable reference at the counter 17 defines a feed speed limit and in addition permits to store and memorize the position of the electrode tool 1 at the instant the signal A commands withdrawal of the electrode tool relative to the workpiece. When the electrode tool is again displaced toward the workpiece, the speed of feed of the electrode tool is decreased as soon as the memorized position is reached.

The Schmitt trigger 21 may be provided with a short delay when it is set, such as to reinforce the braking effect on the electrode when it reaches the memorized position. On the other hand, no delay must be present during resetting of the Schmitt trigger.

The signal at the output of the counter 17 may be varied progressively, or it may be varied as a predetermined function of the difference or error signal B. For that purpose, it is sufficient to replace the Schmitt trigger 21 by a function generator whose output signal is applied to the encoding circuit 24. With such an arrangement, the AND gate 18 needs only have two inputs.

Figure 2:
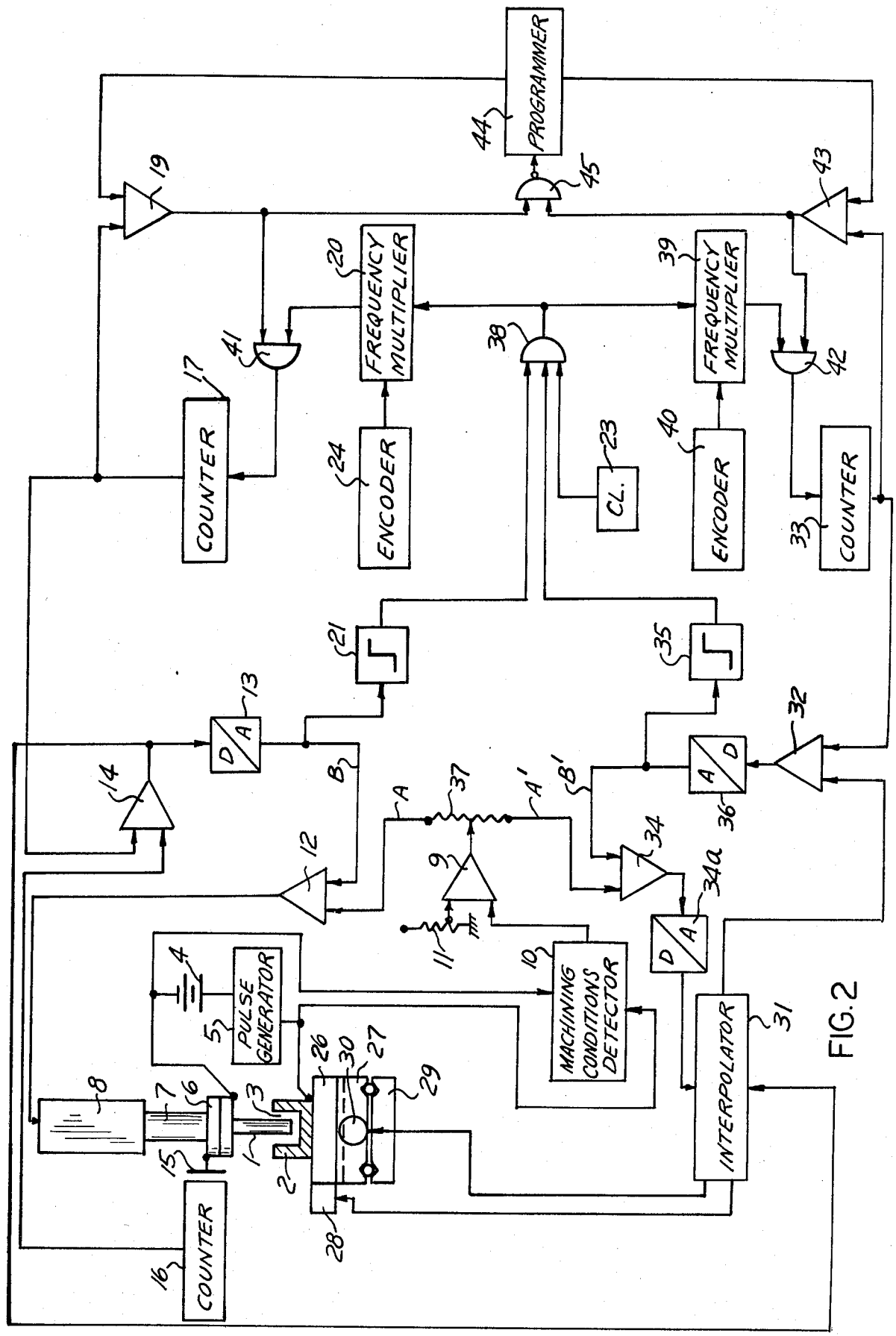
FIG. 2 is a schematic of a system comprising two servo-motors controlled each by a control arrangement similar to that of FIG. 1.

The circuit of FIG. 1 can be used, as shown in the schematic of FIG. 2, to control not only the axial displacement of the electrode tool along a longitudinal axis but also the amplitude transverse translation of the electrode. A portion of the control circuit for the longitudinal displacement of the electrode is the same as the circuit of FIG. 1, and those elements are labeled with the same reference numerals.

As schematically shown in FIG. 2, the electrode workpiece 2 is subjected to a radial translation motion as a result of being mounted on a cross-slide table 26, which is displaced along an axis in the plane of the drawing relative to a cross-slide 27, by means of a servo-motor 28. The cross-slide 27 is displaced relative to a stationary bed 29 along an axis perpendicular to the plane of the drawing, by means of a servo-motor 30. The resulting motion of the workpiece 2 is controlled by an interpolator circuit 31 which supplies to the servo-motors 28 and 30 sinusoidal signals 90° out of phase when the resulting motion is a circular motion. The interpolator circuit 31 may be, for example, similar to the circuit disclosed in U.S. Pat. No. 4,057,703, on the condition that the two servo-motors 28 and 30 consist of stepping motors.

The interpolator circuit 31 has an additional output supplying a signal proportional to the amplitude of the radial motion eccentricity, which is applied to one of the inputs of a differential amplifier or comparator 32 in which it is compared to a reference signal applied to the other input of the comparator and obtained from a pulse counter 33.

The numerical difference between the signals representing the eccentricity amplitude and the reference signal is applied to one of the inputs of an op-amp differential amplifier or comparator 34 and to the input of a Schmitt trigger 35 through a digital analog converter 36 providing at its output an analog signal B'. The other input of the op-amp comparator 34 receives an analog signal A' which is a fraction of the signal at the output of the comparator 9, the other fraction, or signal A, being applied to one of the inputs of the comparator 12. The ratio between the signals A and A' is set by the position of the slider of a potentiometer 37. The output signal from the comparator 34 is in the form of a command signal applied through an analog-digital converter 34a, for example, to the interpolator 31 which defines the eccentricity amplitude of the orbiting motion of the workpiece 2. The three inputs of an AND gate 38 are connected respectively to the output of the Schmitt trigger 21, to the output of the Schmitt trigger 35 and to the output of the constant frequency oscillator or clock 23, the output of the AND gate 38 being connected on one hand to one of the inputs of the frequency multiplier 20 which determines the speed limit of the longitudinal machining feed and, on the other hand, to another frequency multiplier 39 which determines the speed limit of the lateral machining feed, this speed limit being pre-set by an encoder circuit 40 similar to the encoder circuit 24.

The pulses at the output of the frequency multipliers 20 and 39 are applied respectively to one of the inputs of an AND gate 41 and to one of the inputs of another AND gate 42, the other input of the AND gate 41 being connected to the output of the comparator 19 and the other input of the AND gate 42 being connected to the output of a comparator 43. The comparator 43 provides at its output a signal which enables the AND gate 42 when the eccentricity reference signal determined by the counter 33 is less than a predetermined limit value provided at the output of a program circuit 44, and which inhibits the AND gate 42 as soon as that limit value is reached. In the same manner, the signal at the output of the comparator 19 enables the AND gate 41 when the reference position determined by the counter 17 has not yet reached the predetermined value limit set by the programmer 44, and inhibits the AND gate 41 when the limit value is reached. The signals at the output of the comparators 19 and 43 are also applied to the two inputs of an AND gate 45 whose output signal is applied to an input of the programmer 44 in order to effectuate a variation of the limit value according to a predetermined program.

The signal at the output of the comparator 14 is also applied to the interpolator 31 for modulating the angular speed of the lateral translational orbiting motion, such as to decrease the angular speed when the measured axial position of the electrode is less than the reference value and to increase that speed under opposite conditions. Such a modulation permits to decrease any uneven material removal between the machined surfaces of the workpiece in the course of each orbiting cycle.

At the beginning of a machining operation, the counters 17 and 33 are pre-set such as to show respectively the initial relative axial position of the electrodes and the initial eccentricity of the translation motion.

The AND gate 38 is thus inhibited and the position and eccentricity references remain at their initial values. As soon as machining progresses in an axial direction and in a radial direction as detected respectively by the comparators 14 and 32, the Schmitt trigger 21 and 35 each provide a signal which enables the AND gate 38, which in turn allows the pulses provided by the clock 23 to reach the counters 17 and 33, such as to change the electrode axial position reference and the electrode radial translation eccentricity references at predetermined speeds. If, for example, machining progresses less rapidly in the radial direction than in the axial direction than determined by the position reference, no signal appears at the output of the comparator 32 and the Schmitt trigger 35 inhits the AND gate 38 such as to stop the progression of the two references in both those directions. The result is a momentary slow-down of the axial feed until the radial position is reached. When this occurs, the AND gate 38 is again enabled and machining progresses normally in both directions. In this manner, a permanent control of the average relative positions of the electrodes is achieved along those two axes, which permits to simultaneously machine the frontal and lateral surfaces of the workpiece. When a machining fault is detected by the detector circuit 10, the signals A and A' at the output of the comparator 9 provides command signals for withdrawing very rapidly the electrode tool 1 from the workpiece 2 simultaneously in both axial and radial directions. The potentiometer 37 permits to pre-set the ratio between the speeds of the servo-motors such as to achieve an electrode withdrawal in a predetermined direction.

The displacements of the electrode in an axial direction and in the radial directions are limited by a signal applied respectively to the comparator 19 and to the comparator 43. Those signals are provided by the programmer circuit 44 according to a predetermined program, the algebraic signs of those signals being changed as soon as a signal appears at the output of the NAND gate 45, that is when the position references values determined by the counters 17 and 33 have reached their respective limit values.

In the course of a finish pass by means of an electrode tool of any appropriate shape, those limit values are equal such as to achieve a three-dimensional artificial enlargement of the electrode tool. If it is desired to provide the workpiece with a shape different from that of the electrode tool, for example for providing the lateral surfaces of the workpiece with a predetermined taper, the limit value applied to the comparator 43 is decreased each time that the limit value applied to the comparator 19 increases. The counter 33 will count down the pulses at its input until its output signal is equaL to the new limit value and the position of the workpiece 2 is corrected by the comparator 32. Such an arrangement also permits to shape at will the surface of the workpiece by varying the limit values, one relative to the other, according to a function programmed by the programmer circuit 44.

The hereinbefore described apparatus can be used to control any number of servo-motors, each of the servo-motors effecting a relative displacement of the electrodes in a predetermined direction.

Having thus described the present invention by way of typical examples of structure, modification whereof will be apparent to those skilled in the art, what is claimed as new is as follows:

1. In an EDM apparatus comprising means for controlling the relative displacement of machining feed of an electrode workpiece and of an electrode tool wherein the electrodes are displaced relative to each other along a predetermined axis by means of a servo-motor at a speed controlled by a first signal as a function of the machining conditions and by a second signal as a function of the difference between the relative position of said electrodes in said direction and a reference position, said second signal being opposed to said first signal when said reference relative position is reached such as to limit the relative displacement of the electrodes to a predetermined final position, the improvement comprising means for automatically displacing at a predetermined speed said reference relative position as a function of said difference in a direction which is the same as the direction of machining feed such as to maintain said difference below a predetermined value.

2. The improvement of claim 1 comprising comparator means operating said means for displacing said reference relative position as soon as said difference is positive and inhibiting said means for displacing said reference relative position as long as said difference is negative.

3. The improvement of claim 2 wherein said electrodes are displaced relative to each other along a second axis by means of at least a second servo-motor and further comprising means for controlling said second servo-motor by a third signal as a function of the machining conditions and by a fourth signal as a function of the difference between the relative position of said electrodes along said second axis and a reference relative position, means for simultaneously providing a displacement in a predetermined ratio of the reference relative positions of said first servo-motor and of said second servo-motor as soon as each of said reference positions is reached, and means for terminating said displacement as long as at least one of said reference positions is not reached.

4. The improvement of claim 3 wherein means are provided for changing said ratio according to a predetermined program.

5. The improvement of claim 2 wherein said electrodes are displaced relative to each other along a second axis by means of at least a second servo-motor and further comprising means for controlling said second servo-motor by a third signal as a function of the machining conditions and by a fourth signal as a function of the difference between the relative position of said electrodes along said second axis and a reference relative position, means for simultaneously producing a displacement in a predetermined ratio of the reference relative positions of said first servo-motor and of said second servo-motor as soon as the difference between the relative position of said electrodes and the reference relative position and the difference between the reference relative positions of said first and second servo-motors are both positive.

6. The improvement of claim 5 wherein means are provided for changing said ratio according to a predetermined program.

* * * * *

UNITED STATES PATENT AND TRADEMARK OFFICE
CERTIFICATE OF CORRECTION

PATENT NO. : 4,263,494
DATED : April 21, 1981
INVENTOR(S) : Roland Martin

It is certified that error appears in the above-identified patent and that said Letters Patent are hereby corrected as shown below:

Col. 5, line 17, change "AND" to --HAND--.

Col. 6, line 20, change "equaL" to --equal--.

Signed and Sealed this

Twenty-seventh Day of October 1981

[SEAL]

Attest:

GERALD J. MOSSINGHOFF

Attesting Officer     Commissioner of Patents and Trademarks